United States Patent [19]

Stähler

[11] 4,318,810

[45] Mar. 9, 1982

[54] APPARATUS FOR THE CONVERSION OF POLLUTANTS CONTAINED IN EFFLUENTS AND EFFLUENT SLUDGES

[76] Inventor: Theo Stähler, Hadamar-Niederzeuzheim, Mühlenhof, Fed. Rep. of Germany

[21] Appl. No.: 190,857

[22] PCT Filed: May 19, 1979

[86] PCT No.: PCT/DE79/00050

§ 371 Date: Jan. 22, 1980

§ 102(e) Date: Nov. 19, 1979

[87] PCT Pub. No.: WO79/01096

PCT Pub. Date: Dec. 13, 1979

[30] Foreign Application Priority Data

May 22, 1978 [DE] Fed. Rep. of Germany ....... 2822347

[51] Int. Cl.$^3$ .............................................. C02F 3/04
[52] U.S. Cl. .................................... 210/150; 261/92; 210/619
[58] Field of Search .............. 210/619, 615, 150, 151, 210/219, 220; 261/92

[56] References Cited

U.S. PATENT DOCUMENTS

| | | | |
|---|---|---|---|
| 3,747,904 | 7/1973 | Gross | 261/92 |
| 4,160,736 | 7/1979 | Prosser | 210/150 |
| 4,184,946 | 1/1980 | Kato | 210/615 |

FOREIGN PATENT DOCUMENTS 2638665 3/1978 Fed. Rep. of Germany ...... 210/151
54-99350 8/1979 Japan .................................. 210/151

*Primary Examiner*—Benoit Castel
*Attorney, Agent, or Firm*—Max Fogiel

[57] ABSTRACT

The invention concerns an apparatus for the conversion of pollutants contained in effluents and effluent sludges, particularly of harmful substances and especially of excreta, into harmless substances with one or more hollow bodies rotatably arranged in a conversion pool or sludge aerating pool, which bodies emerge at one side of the pool completely out of the water or sludge and become completely immersed at the other side and whose part which is uppermost at the emerging side is lowermost at the immersion side, and vice versa. There is the danger, with such hollow bodies, that over time sludge settles in the hollow bodies. An anaerobic fermentation may take place in this settled sludge, during which the harmful substances rot but do not decompose.

To prevent settling of sludge in the hollow bodies, it is proposed according to the invention to use hollow bodies which are laterally closed and opened at the top and below, and which are subdivided by an imperforated partition wall extending approximately parallel to the upper and lower opening.

18 Claims, 3 Drawing Figures

APPARATUS FOR THE CONVERSION OF POLLUTANTS CONTAINED IN EFFLUENTS AND EFFLUENT SLUDGES

BACKGROUND OF THE INVENTION

The invention related to an apparatus for the conversion of pollutants contained in effluents and effluent sludges, in particular of harmful substances and more particularly of excreta, into harmless substances, comprising one or more revolving hollow bodies accommodated in conversion pools or sludge aerating pools adapted to be raised completely from the water on one side of the conversion or sludge aerating pool and to be totally immersed on the other side, that portion thereof which is uppermost on the emerging side being lowermost on the immersion side and vice versa.

Apparatus comprising hollow bodies of the aforesaid type, the walls of which comprise a large number of perforations, and the perforations being confined to that wall region which is uppermost on the emerging side are employed in practice. In such apparatus there exists a risk that the sludge which has entered the hollow bodies on their way underneath the water surface or which is contained in the water which has thus entered, fails to drain completely or at all from the hollow bodies on their way above the water surface or to be resuspended during the dipping of the hollow body into the water on the immersion side, thus resulting in persistent sludge deposits in the hollow bodies. In these permanent sludge deposits in the hollow bodies there may then take place anaerobic fermentation resulting in rotting of the pollutants but without their complete decomposition.

SUMMARY OF THE INVENTION

It is an object of the present invention to adapt an apparatus of the aforesaid type in such a manner that practically no sludge can become deposited in the hollow bodies.

This object is substantially attained in that the hollow bodies are closed on the sides and open on top and below and are subdivided by a closed partition extending approximately parallel to the upper and lower aperture.

The revolving hollow bodies are arranged in such a manner that on the emerging side the upper aperture faces upwardly and the lower aperture faces downwardly, the reverse applying to the immersion side.

The hollow body which emerges on the emerging side from the water or sludge will thus carry along water or sludge upwardly above the water surface by means of the space above the partition, such water or sludge trickling back slowly to the water surface over the upper edge of the hollow body which faces the axis of rotation. On the immersion side the hollow body, by means of its upper space which at that instant, however, is on the underside, carries air below the water surface. During the passage of the hollow body under the water surface, this air slowly trickles around the foremost edge of the hollow body which faces the axis of rotation, and rises in the water in the form of tiny bubbles. Sludge does not become deposited in such hollow bodies, at least not permanently, since the drainage of sludge during the passage of the hollow bodies below the water surface is not impeded by the presence of even a perforated wall, such sludge as may adhere to the walls of the hollow bodies being rinsed off during the passage of the hollow bodies below the water surface.

In this context it is advantageous to accommodate bodies having a large air and water accessible surface area inside the hollow bodies.

In order to prevent such bodies accommodated inside the hollow bodies from falling out during the revolution of the hollow bodies, it is possible to provide the upper and lower apertures of the hollow bodies with an apertured plate, more particularly a sieve having a mesh size which is as large as possible.

Further features of the invention are apparent from the description of the drawing and from the subsidiary claims, and it is to be noted that all individual features and all combinations of individual features are considered to be of inventive character.

BRIEF DESCRIPTION OF THE DRAWINGS

FIG. 1 represents a plan view of an apparatus in accordance with the invention;

FIG. 2 represents a vertical section along the line A—A in FIG. 1;

FIG. 3 represents a horizontal section through a hollow body along the line B—B in FIG. 2.

DESCRIPTION OF PREFERRED EMBODIMENTS

Figure 1:
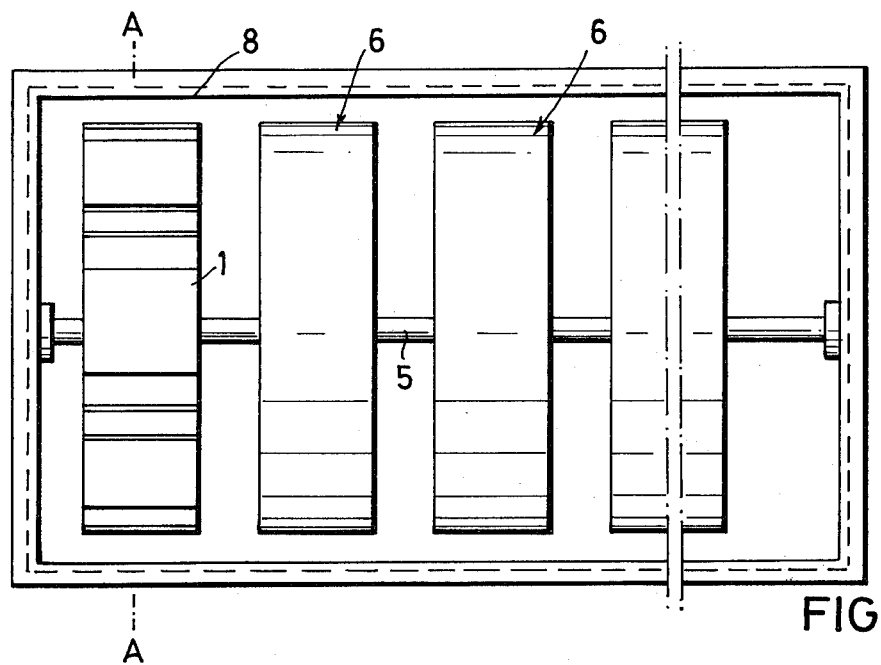
In FIG. 1 to 3 the invention is illustrated by way of embodiments thereof, serving as examples without the invention being limited to such embodiments.
Figure 2:
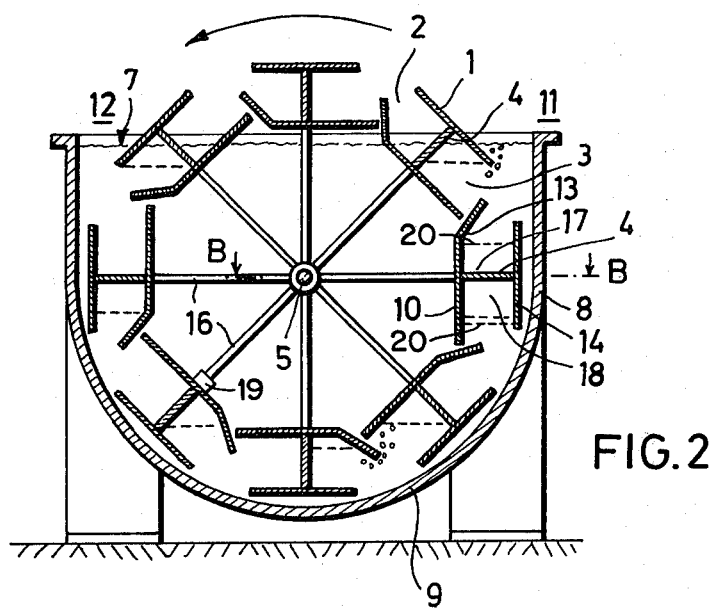
Figure 3:
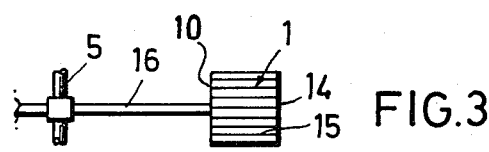

Several rotors 6 are arranged in the conversion or sludge aerating pool 8 one behind the other, rotatable about the axis of rotation 5. The water or sludge feed is provided at one end and the water or sludge discharge at the opposite end of the conversion pool 8. Neither of these is illustrated as not being part of the invention. The direction of flow of the effluent or sludge is to be parallel to the axis of rotation 5. The axis of rotation 5 is below the water or sludge surface 7 and advantageously parallel thereto. In this context the axis of rotation 5 is advantageously so arranged that not more than about ⅓ of the path of the trajectory of the revolving hollow bodies 1 is above the water surface 7. The rotors 6, which in the simplest construction consist of individual spokes 16 mounted radially on the revolving axle 5, carry the hollow bodies 1 on their peripheries. Advantageously the bottom 9 of the conversion or sludge aerating pool 9 is hemicircular and the rotors 6 with the hollow bodies 1 are advantageously so arranged that underneath the water or sludge surface 7 the hollow bodies 1 revolve as intimately close as possible to the bottom 9. On the emerging side 11 the hollow bodies 1 emerge from the water or sludge and they dip again into the water or sludge on the immersion side 12. The direction of rotation is denoted in FIG. 2 by an arrow. The revolving axle 5 is driven in a manner known per se which is not illustrated and not considered part of the invention. The hollow bodies may have optional shape, e.g. a cylindrical shape. A square or rectangular cross section is advantageous. The hollow bodies 1 are so shaped and arranged that they are open on top and below but closed on the sides when in their extreme lateral position, i.e. whenever they are in the same plane as the revolving axle 5. The hollow body 1 is divided into an upper space 17 and a lower space 18 by the partition 4 which advantageously is substantially normal to an axis passing through the upper aperture 2 and the lower aperture 2. The partition 4 is nonperforated. The upper end 13 of that wall 10 of the hollow body 1 which faces the revolving axle 5 is slightly bent in the direction of the wall 14 which faces away from the revolving axle 5. In this context the revolving hollow bodies 1 are so fitted to the spokes 16 of the rotors 6 that in the lowermost position of a hollow body 1 the wall 10 which faces the revolving axle 5 extends below that wall 10 of the preceding hollow body 1 which faces the revolving shaft 5. Bodies 15 having a large surface area accessible to air and water are advantageously provided in the hollow bodies 1. In the illustrated exemplary embodiment these are in the form of disc-shaped bodies 15 arranged in the two spaces 17 and 18 of the hollow bodies 1 normal to the revolving axle 5 in spaced-apart relationship. This arrangement is brought about in a non-illustrated manner known per se and not being considered part of the invention. The hollow bodies 1 which emerge on the emergence side 11 from the surface 7 of the water or the sludge carry water or sludge upwardly above the water surface in the upper space 17. During the passage of the hollow bodies above the water surface, the water or sludge drains back mostly to the water surface over the free edge of the upper end 13 of the wall 10. On the immersion side 12 the upper space 17 of the hollow bodies 1 is located lowermost. During dipping into the water or sludge surface 7 air is carried below the surface 7 by the hollow bodies 1 in the space 17. In the illustrated arrangement of the revolving axle 5 the spaces 17 of the hollow bodies 1 are filled approximately halfway with air after dipping into the surface 7. This air escapes slowly from the spaces 17 in the form of fine bubbles as soon as the free edge of the angled end 13 of the wall 10 and the water surface in the space 17 are in a common plane. As soon as the preceding hollow body 1 is on the ascending portion of the trajectory, i.e. when the wall 10 of this preceding hollow body rises at an incline upwardly away from the next following hollow body, part of the air bubbling from the space 17 of the next following hollow body 1 flows into the cavity 18 of the preceding hollow body 1 and partly forces the water therefrom. The buoyancy of the hollow bodies 1 on the ascending side of the trajectory is thereby assisted. This configuration of the hollow bodies 1 has the additional substantial advantage that in the descending hollow bodies 1 in the space 17 and in the ascending hollow bodies 1 in the space 18, the interface water/air is continuously shifted in relation to the bodies 15 having the large surface area accessible to air and water, causing ever new regions of the biological lawn being formed on the bodies and on the inner peripheries of the hollow bodies 1 to come into contact with the interface air/water, whereby the effectiveness of the biological lawn is increased. The effectiveness of the biological lawn is increased even further by virtue of the fact that in the descending hollow bodies in the spaces 17 and in the ascending hollow bodies in the space 18, the water column acting on these spaces causes the air contained therein to be under increased pressure, albeit only relatively slightly so. It is moreover possible for the hollow bodies to be fixed to the rotors in an adjustable manner by joint 19.

In order to prevent such bodies accommodated inside the hollow bodies from falling out during the revolution of the hollow bodies, it is possible to provide the upper and lower apertures of the hollow bodies with an apertured plate, more particularly a sieve 20 having a mesh size which is as large as possible.

I claim:

1. An arrangement for the conversion of pollutants contained in effluents and effluent sludges, in particular of harmful substances, into harmless substances, comprising: a plurality of hollow bodies accommodated in an effluent pool adapted to be raised completely from the water or sludge on one side of the pool and to be totally immersed on the other side, that portion which on the emerging side is uppermost, being lowermost on the immersion side and vice versa, said hollow bodies being laterally closed and being open on top and below by upper and lower apertures comprising inlet and outlet, and a closed partition which is substantially parallel to the upper and lower apertures, said hollow bodies comprising a rotor element rotatable about an axis and including a plurality of receptacles spaced about said axis radially outwardly thereof, said element being positioned so that each receptacle utlimately dips into and emerges out of the effluent in the pool, said receptacles each having two open sides which are respectively leading and trailing as considered with reference to the direction of rotation; said partition comprising an imperforate partition wall located in and subdividing the interior of each receptacle generally parallel to the plane of the respective open sides thereof, said axis extending substantially parallel to an upper surface of the effluent in the pool, an imaginary plane passing through said open sides of the respective receptable extending approximately vertical and normal to said axis of rotation when the respective receptacle is in its most lateral position during rotation of the rotor, said receptacles each having a radially outer wall and a radially inner wall of which the latter has a radially outer free edge portion, said edge portion extending to beneath said radially inner wall of the immediately preceding receptacle, an axis which passes through the upper and lower apertures being horizontal and the respective rotor element being the lower-most position, when an end of the wall facing towards the axis of rotation and being uppermost on the emerging side extends to a level below the same wall of the immediately preceding rotor element viewed in the direction of rotation, air transported by one rotor element under the surface of the water being released below the surface of the water around the front edge of the rotor element facing the axis of rotation and ascending as fine bubbles through the water, so that a portion of said air passes into the space under the rotor element where it forms a bubble said bubble forcing the rotating rotor element upwards for reducing the amount of energy required to drive said rotor element, when part of the air bubbling from the upper space of one hollow body flows into the lower space of the preceding hollow body.

2. An arrangement as defined in claim 1, said rotor having a peripheral zone and said receptacles being arranged in said zone of the rotor.

3. An arrangement as defined in claim 1, wherein said receptacles include means for being adjustably mounted on said rotor.

4. An arrangement as defined in claim 1, and further comprising at least one additional one of said rotors and partition wall.

5. An arrangement as defined in claim 4, wherein said rotors are mounted in series.

6. An arrangement as defined in claim 5, further comprising a common shaft mounting all of said rotors thereon.

7. An arrangement as defined in claim 1, wherein the pool has a bottom wall of hemi-circular outline.

8. An arrangement as defined in claim 7, wherein said receptacles travel past said bottom wall immediately adjacent thereto.

9. An arrangement as defined in claim 1, said receptacles each having a radially outer wall and a radially inner wall, and wherein an outer edge portion of said radially inner wall which partially bounds the leading one of said openings is bent in direction towards said radially outer wall.

10. An arrangement as defined in claim 1, said rotor having an axis of rotation located above and parallel to the surface of the effluent and parallel to the direction of flow thereof.

11. An arrangement as defined in claim 1, wherein said bodies are accommodated in said receptacle and have a large surface area accessible to water and air.

12. An arrangement as defined in claim 11, wherein said bodies are of material resistant to attack by the effluent.

13. An arrangement as defined in claim 12, wherein said material is synthetic plastic material.

14. An arrangement as defined in claim 11, wherein said bodies are disk-shaped and spaced from one another.

15. An arrangement as defined in claim 14, wherein said bodies are located in planes extending normal to said axis of rotation.

16. An arrangement as defined in claim 1, and further comprising an appertured plate covering the openings of the respective receptacle.

17. An arrangement as defined in claim 16, wherein said plate is a coarse sieve.

18. An arrangement as defined in claim 1, and said rotor having a peripheral zone and said receptacles being arranged in said zone of the rotor, aid receptables being mounted adjustably on said rotor, at least one additional one of said rotors and partition wall, said rotors being mounted in series, a common shaft mounting all of said rotors thereon, said pool having a bottom wall of hemi-circular outline, said receptacles traveling past said bottom wall immediately adjacent thereto, an outer edge portion of said radially inner wall which partially bounds the leading one of said openings being bent in direction towards said radially outer wall, said rotor having an axis of rotation located above the parallel to the surface of the effluent and parallel to the direction of flow thereof, said bodies being accommodated in said receptacle and having a large surface area accessible to water and air, an appertured plate covering the openings of the respective receptacle, said plate being a coarse sieve, said bodies being of material resistant to attach by the effluent, said material being synthetic plastic material, said bodies being disk-shaped and spaced from one another, said bodies being located in planes extending normal to said axis of rotation.

* * * * *